US012562899B1

(12) United States Patent　　(10) Patent No.: US 12,562,899 B1
Layouni et al.　　(45) Date of Patent: Feb. 24, 2026

(54) CRYPTOGRAPHIC KEY UPDATE SYSTEM FOR UPDATING 256-BIT CRYPTOGRAPHIC KEYS

(71) Applicant: GM Global Technology Operations LLC, Detroit, MI (US)

(72) Inventors: Mohamed A. Layouni, Fraser, MI (US); Brian Farrell, Troy, MI (US); Christopher J. Kloote, Livonia, MI (US); Manohar Reddy Nanjundappa, Cedar Park, TX (US); Kenneth Junk, Marshalltown, IA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 18/755,507

(22) Filed: Jun. 26, 2024

(51) Int. Cl.
　　*H04L 9/08*　　(2006.01)
　　*H04L 9/06*　　(2006.01)
(52) U.S. Cl.
　　CPC .......... *H04L 9/0891* (2013.01); *H04L 9/0631* (2013.01); *H04L 9/0643* (2013.01); *H04L 9/0822* (2013.01)
(58) Field of Classification Search
　　CPC ... H04L 9/0891; H04L 9/0631; H04L 9/0643; H04L 9/0822
　　See application file for complete search history.

(56) References Cited

U.S. PATENT DOCUMENTS 8,538,011 B2 *　9/2013　Moskowitz ........... H04L 9/3231
　　　　　　　　　　　　　　　　　　380/231
8,582,777 B2 *　11/2013　Urivskiy ............... H04L 9/0822
　　　　　　　　　　　　　　　　　　380/278

(Continued)

FOREIGN PATENT DOCUMENTS

DE　　102020200726 A1　7/2021
DE　　102023115999 A1　9/2023
WO　　　2021136072 A1　7/2021

OTHER PUBLICATIONS

Autosar, Specification of Secure Hardware Extensions, Autosar FO R22-1, 2022 (Year: 2022).

(Continued)

*Primary Examiner* — J. Brant Murphy
(74) *Attorney, Agent, or Firm* — Vivacqua Crane, PLLC

(57)　　　　ABSTRACT

Methods for updating 256-bit cryptographic keys by a cryptographic key update system include transmitting a first transmission, a second transmission, and a third transmission. The second transmission is a symmetric key encryption under a key encryption key of a concatenation of a plurality of parameters and a new cryptographic key. The sender derives the key encryption key by transforming an authentication key and a bit string of constant values based on a one-way compression function that is one of the following: a modification detection code 2 (MDC-2) cryptographic hash function with a 128-bit advanced encryption standard (AES-128) as the underlying block cipher, a modification detection code 4 (MDC-4) cryptographic hash function with the 128-bit advanced encryption standard (AES-128) as the underlying block cipher, the Hirose compression function with the 256-bit advanced encryption standard (AES-256) as the underlying block cipher, and a 256-bit hash function.

20 Claims, 8 Drawing Sheets

(56)     References Cited

U.S. PATENT DOCUMENTS

| | | | |
|---|---|---|---|
| 8,776,500 B2 * | 7/2014 | Gonze | F01N 3/101 |
| | | | 60/284 |
| 9,843,447 B1 * | 12/2017 | Bishop | H04L 9/14 |
| 10,053,148 B2 * | 8/2018 | Auden | B62D 6/002 |
| 10,972,436 B1 | 4/2021 | Simanel et al. | |
| 2005/0140964 A1 * | 6/2005 | Eschenauer | H04W 12/041 |
| | | | 356/10 |
| 2010/0268960 A1 * | 10/2010 | Moffat | H04L 9/0643 |
| | | | 713/181 |
| 2016/0264071 A1 * | 9/2016 | Ujiie | H04L 9/3242 |
| 2019/0028267 A1 | 1/2019 | Takemori et al. | |
| 2019/0068361 A1 | 2/2019 | Ye et al. | |
| 2019/0098006 A1 * | 3/2019 | Kim | H04L 9/3273 |
| 2019/0394172 A1 * | 12/2019 | Hersent | H04L 9/0861 |
| 2020/0044842 A1 | 2/2020 | Usui et al. | |
| 2020/0267547 A1 * | 8/2020 | Tal | H04L 9/08 |
| 2021/0036864 A1 | 2/2021 | Lu et al. | |
| 2022/0083665 A1 * | 3/2022 | Kocher | H04L 9/3247 |
| 2024/0031143 A1 | 1/2024 | Poulard et al. | |
| 2024/0089097 A1 | 3/2024 | Sugahara et al. | |
| 2024/0333479 A1 | 10/2024 | Farrell et al. | |
| 2025/0023724 A1 | 1/2025 | Morita et al. | |

OTHER PUBLICATIONS

Pardo, Jose Luis Gomez, and Carlos Gomez-Rodriguez, "The SHA-3 family of Cryptographic hash functions and extendable-output functions." Maple document (2015) (Year: 2015).

* cited by examiner

600

CRYPTOGRAPHIC KEY UPDATE SYSTEM FOR UPDATING 256-BIT CRYPTOGRAPHIC KEYS

INTRODUCTION

The present disclosure relates to a cryptographic key update system and methods for updating 256-bit cryptographic keys.

A cryptographic key represents a string of characters that are processed by cryptographic algorithms to either encode or decode cryptographic data. A secure hardware extension (SHE) is an on-chip extension given to a microcontroller for enhancing the security of cryptographic keys. Specifically, the secure hardware extension moves control over cryptographic keys from the software domain to the hardware domain to protect the cryptographic keys from cyberattacks.

Quantum computers are machines that exploit quantum mechanical phenomena to solve mathematical problems that are challenging for conventional computers to calculate, and therefore have the potential to break many of the public-key and symmetric-key cryptosystems that are currently in use. Accordingly, quantum-resistant cryptography involves developing cryptographic systems that are secure against both quantum and classical computers and are compatible with existing communications protocols and networks.

The AUTomotive Open System Architecture (AUTOSAR) secure hardware extension key update protocol only supports the provisioning and update of 128-bit cryptographic keys. However, post-quantum security requires updating to systems that include cryptographic keys having a bit length of 256 bits, or even bit lengths greater than 256 bits. It is to be appreciated that relatively simple updates of the current secure hardware extension key update protocol are not sufficient to support cryptographic keys having an increased bit length of 256 bits, or greater than 256 bits because transport security based on the current secure hardware extension key update protocol is weaker than required when 256-bit keys are updated.

Thus, while current approaches for provisioning and updating cryptographic keys achieve their intended purpose, there is a need in the art for an improved approach for updating cryptographic keys having an increased bit length.

SUMMARY

According to several aspects, a method for updating cryptographic keys to 256-bit cryptographic keys by a cryptographic key update system is disclosed. The method includes transmitting, by a sender, a first transmission to one or more controllers that are part of a vehicle. The method includes transmitting, by the sender, a second transmission to the one or more controllers, where the second transmission is a symmetric key encryption under a key encryption key of a concatenation of a plurality of parameters and a new cryptographic key, and the sender derives the key encryption key by transforming an authentication key and a bit string of constant values based on a one-way compression function that is one of the following: a modification detection code 2 (MDC-2) cryptographic hash function with a 128-bit advanced encryption standard (AES-128) as an underlying block cipher, a modification detection code 4 (MDC-4) cryptographic hash function with the AES-128 as the underlying block cipher, a Hirose compression function with a 256-bit advanced encryption standard (AES-256) as the underlying block cipher, and a 256-bit hash function. The method includes transmitting, by the sender, a third transmission to the one or more controllers, where the third transmission is a 128-bit advanced encryption standard cipher-based message authentication code under a first message authentication code (MAC) key of a concatenation of the first transmission and the second transmission. The method includes verifying, by the one or more controllers, data transmitted by the first transmission, the second transmission, and the third transmission. In response to determining the data transmitted by the first transmission, the second transmission is valid, the method includes extracting, by the one or more controllers, the new cryptographic key. Finally, the method includes executing, by the one or more controllers, one or more cryptographic validation operations based on the new cryptographic key.

In another aspect, in response to extracting the new cryptographic key, computing, by the one or more controllers, a fourth transmission and a fifth transmission based on the new cryptographic key.

In yet another aspect, the method includes transmitting, by the one or more controllers, the fourth transmission to the sender, where the fourth transmission is a bit string that is a concatenation of the first transmission received and a symmetric key encryption of a freshness counter value in the second transmission under a second encryption key and a symmetric key AES encryption.

In an aspect, the method includes deriving, by the one or more controllers, the second encryption key by transforming the new cryptographic key and the bit string of constant values based on one of the following: an advanced encryption standard Miyaguchi-Preneel compression function and a 128-bit hash function.

In another aspect, the method includes transmitting, by the one or more controllers, the fifth transmission to the sender, where the fifth transmission is a 128-bit message authentication code under a second MAC key of the fourth transmission.

In yet another aspect, deriving, by the one or more controllers, the second MAC key by transforming the new cryptographic key and the bit string of constant values based on one of the following an advanced encryption standard Miyaguchi-Preneel compression function and a 128-bit hash function.

In an aspect, the method includes transmitting, by the one or more controllers, the fifth transmission to the sender, where the fifth transmission is a 256-bit message authentication code under a second MAC key of the fourth transmission.

In another aspect, the method includes deriving, by the one or more controllers, the second MAC key based on one of the following: the MDC-2 cryptographic hash function with the AES-128 as the underlying block cipher, the MDC-4 cryptographic hash function with the AES-128 as the underlying block cipher, and the Hirose compression function with the AES-256 as the underlying block cipher.

In yet another aspect, the method includes receiving, by the sender, the fourth transmission and the fifth transmission from the one or more controllers.

In an aspect, in response to receiving the fourth transmission and the fifth transmission, verifying, by the sender, the fourth transmission and the fifth transmission to ascertain that the one or more controllers obtained a correct version of the new cryptographic key.

In yet another aspect, the method includes determining, by the sender, the first transmission that includes a concatenation of an identifier corresponding to the one or more controllers, a slot identifier of the new cryptographic key, and a slot identifier of the authentication key.

In an aspect, a method for updating cryptographic keys to 256-bit cryptographic keys by a cryptographic key update system is disclosed, and includes transmitting, by a sender, a first transmission to one or more controllers that are part of a vehicle. The method includes transmitting, by the sender, a second transmission to the one or more controllers, where the second transmission is a symmetric key encryption under a key encryption key of a concatenation of a plurality of parameters and a new cryptographic key, and the sender derives the key encryption key by transforming an authentication key and a bit string of constant values based on a one-way compression function that is one of the following: a MDC-2 cryptographic hash function with an AES-128 as an underlying block cipher, a MDC-4 cryptographic hash function with the AES-128 as the underlying block cipher, a Hirose compression function with a 256-bit advanced encryption standard (AES-256) as the underlying block cipher, and a 256-bit hash function. The method includes transmitting, by the sender, a third transmission to the one or more controllers, where the third transmission is a 128-bit advanced encryption standard cipher-based message authentication code under a first MAC key of a concatenation of the first transmission and the second transmission. The method includes verifying, by the one or more controllers, data transmitted by the first transmission, the second transmission, and the third transmission. In response to determining the data transmitted by the first transmission, the second transmission is valid, the method includes extracting, by the one or more controllers, the new cryptographic key. The method includes transmitting, by the one or more controllers, a fourth transmission to the sender, where the fourth transmission is a bit string that is a concatenation of the first transmission received and a symmetric key encryption of a freshness counter value in the second transmission under a second encryption key and a symmetric key AES encryption. The method includes transmitting, by the one or more controllers, a fifth transmission to the sender, where the fifth transmission is a 256-bit message authentication code under a second MAC key of the fourth transmission. Finally, the method includes executing, by the one or more controllers, one or more cryptographic validation operations based on the new cryptographic key.

In another aspect, the method includes deriving, by the one or more controllers, the second MAC key based on one of the following: the MDC-2 cryptographic hash function with the AES-128 as the underlying block cipher, the MDC-4 cryptographic hash function with the AES-128 as the underlying block cipher, and the Hirose compression function with the AES-256 as the underlying block cipher.

In yet another aspect, the method includes receiving, by the sender, the fourth transmission and the fifth transmission from the one or more controllers.

In an aspect, in response to receiving the fourth transmission and the fifth transmission, the method includes verifying, by the sender, the fourth transmission and the fifth transmission to ascertain that the one or more controllers obtained a correct version of the new cryptographic key.

In another aspect, the method includes deriving, by the sender, the first MAC key by transforming the authentication key and the bit string of constant values based on one of the following: an advanced encryption standard Miyaguchi-Preneel compression function and a 128-bit hash function.

In yet another aspect, a method for updating cryptographic keys to 256-bit cryptographic keys by a cryptographic key update system is disclosed. The method includes transmitting, by a sender, a first transmission to one or more controllers that are part of a vehicle. The method includes transmitting, by the sender, a second transmission to the one or more controllers, where the second transmission is a symmetric key encryption under a key encryption key of a concatenation of a plurality of parameters and a new cryptographic key, and the sender derives the key encryption key by transforming an authentication key and a bit string of constant values based on a one-way compression function that is one of the following: a MDC-2 cryptographic hash function with an AES-128 as an underlying block cipher, a MDC-4 cryptographic hash function with the AES-128 as the underlying block cipher, an Hirose compression function with an AES-256 as the underlying block cipher, and a 256-bit hash function. The method includes transmitting, by the sender, a third transmission to the one or more controllers, where the third transmission is a 256-bit message authentication code under a first MAC key of a concatenation of the first transmission and the second transmission. The method includes verifying, by the one or more controllers, data transmitted by the first transmission, the second transmission, and the third transmission. In response to determining the data transmitted by the first transmission, the second transmission is valid, the method includes extracting, by the one or more controllers, the new cryptographic key. The method includes transmitting, by the one or more controllers, a fourth transmission to the sender, where the fourth transmission is a bit string that is a concatenation of the first transmission received and a symmetric key encryption of a freshness counter value in the second transmission under a second encryption key and a symmetric key AES encryption. The method includes transmitting, by the one or more controllers, a fifth transmission to the sender, where the fifth transmission is a 256-bit message authentication code under a second MAC key of the fourth transmission. Finally, the method includes executing, by the one or more controllers, one or more cryptographic validation operations based on the new cryptographic key.

In an aspect, the method includes deriving, by the sender, the first MAC key by transforming the authentication key and the bit string of constant values based on a 256-bit message authentication code function.

In another aspect, receiving, by the sender, the fourth transmission and the fifth transmission from the one or more controllers.

In yet another aspect, in response to receiving the fourth transmission and the fifth transmission, the method includes verifying, by the sender, the fourth transmission and the fifth transmission to ascertain that the one or more controllers obtained a correct version of the new cryptographic key.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
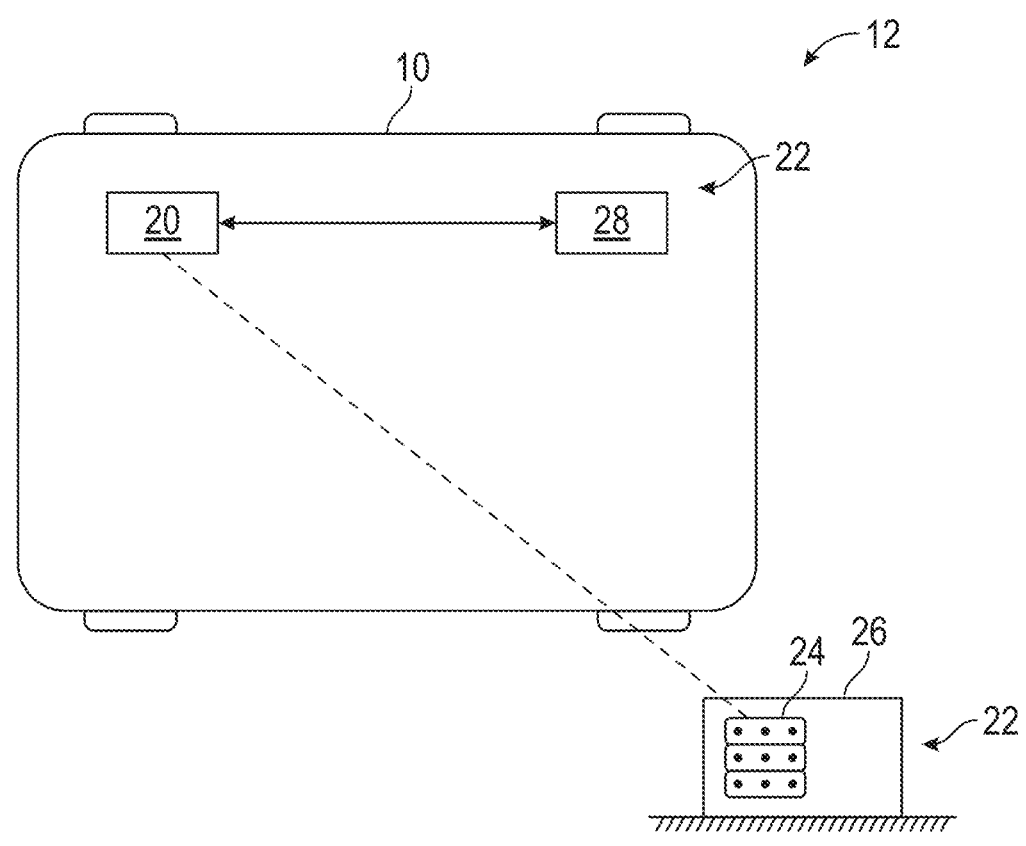
FIG. 1 is a schematic diagram of the disclosed cryptographic key update system in a vehicle including one or more controllers in communication with a sender that is either located at a back-office or is one or more trust anchor controllers located within the vehicle, according to an exemplary embodiment.

Referring to FIG. 1, a schematic diagram of a vehicle 10 including one or more controllers 20 that are part of a cryptographic key update system 12 is illustrated. It is to be appreciated that the vehicle 10 may be any type of vehicle such as, but not limited to, a sedan, truck, sport utility vehicle, van, or motor home. The one or more controllers 20 represent a security peripheral device that receives cryptographic key update transmissions from a sender 22 that is part of the cryptographic key update system 12. In one embodiment, the sender 22 is a computer 24 located at a back-office 26 in a location that is remote from the vehicle 10, where the computer 24 is in wireless communication with the one or more controllers 20. Alternatively, in another embodiment, the sender 22 is one or more trust anchor controllers 28 that are part of the vehicle 10, where the one or more controllers 20 are in electronic communication with the one or more trust anchor controllers 28.

As explained below, the cryptographic key update system 12 shown in FIG. 1 supports a cryptographic key update protocol for updating 256-bit cryptographic keys at 256-bit transport security. The cryptographic key update protocol is backward compatible and may also support updating a 128-bit cryptographic key to a 256-bit cryptographic key. In one non-limiting embodiment, the cryptographic key update system 12 supports the AUTomotive Open System Architecture (AUTOSAR) secure hardware extension key update protocol. However, it is to be appreciated that the cryptographic key update system 12 may support any other type of cryptographic key update protocol for updating a 256-bit cryptographic key, or for updating a 128-bit cryptographic key to a 256-bit cryptographic key. Furthermore, although a vehicle 10 is described and illustrated in FIG. 1, it is to be appreciated that the cryptographic key update system 12 is not limited to a vehicle and may be employed in other applications as well. Indeed, the cryptographic key update system may be used in other applications that employ cryptographic keys such as, for example, a smartphone or camera.

Figure 2:
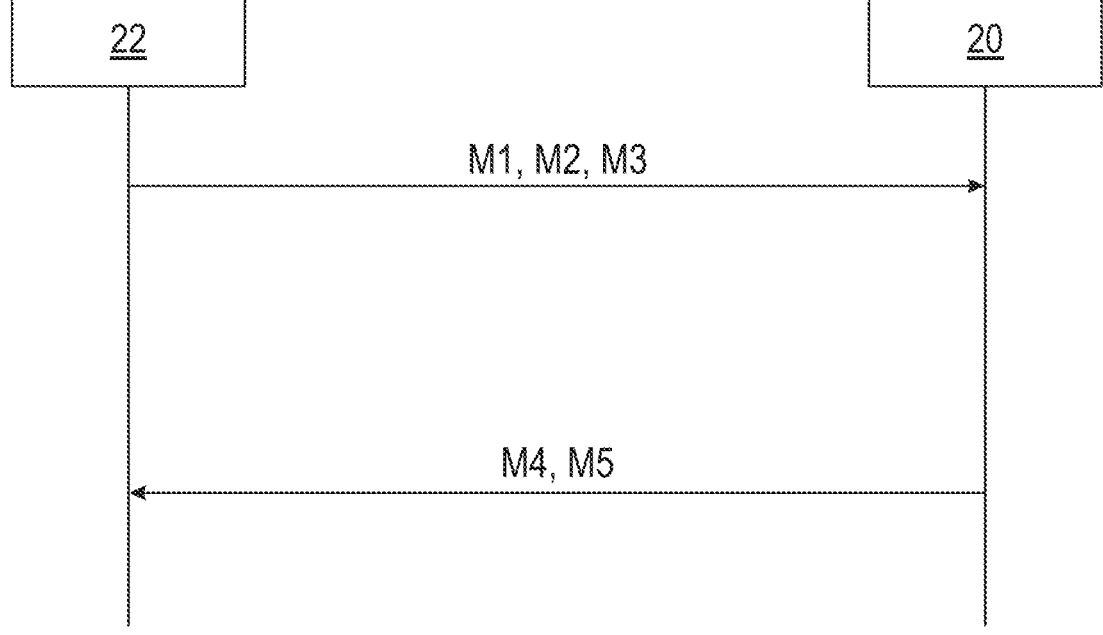
FIG. 2 is a diagram of exchanging transmissions between the one or more controllers and the sender shown in FIG. 1, according to an exemplary embodiment.

FIG. 2 is a diagram illustrating transmissions exchanged between the one or more controllers 20 and the sender 22. Specifically, in the embodiment as shown in FIG. 2, the sender 22 determines and transmits a first transmission M1, a second transmission M2, and a third transmission M3 to the one or more controllers 20. The first transmission M1, the second transmission M2, and the third transmission M3 include information about a new cryptographic key, an encryption of the new cryptographic key, and a message authentication code (MAC) of a concatenation of the first transmission M1 and the second transmission M2. Although FIG. 2 illustrates three transmissions M1, M2, and M3, it is to be appreciated that FIG. 2 is merely exemplary in nature and the sender 22 may transmit the data items based on any number of transmissions to the one or more controllers 20. It is also to be appreciated that the transmissions M1, M2, and M3 may be transmitted in any order and do not need to be transmitted sequentially, however, the one or more controllers 20 receive all of the data items in the transmissions M1, M2, and M3 first before verifying the data transmitted by the transmissions M1, M2, and M3 and extracting the new encryption key.

The one or more controllers 20 executes one or more cryptographic validation operations based on the new cryptographic key, where the one or more cryptographic operations include, but not limited to, MAC verification, decryption, compression, and key derivation. In response to extracting the new cryptographic key, the one or more controllers 20 then compute a fourth transmission M4 and a fifth transmission M5 based on the new cryptographic key. The one or more controllers 20 then transmit the fourth transmission M4 and the fifth transmission M5 back to the sender 22. The sender 22 receives the fourth transmission M4 and the fifth transmission M5 from the one or more controllers 20. In response to receiving the fourth transmission M4 and the fifth transmission M5, the sender 22 then verifies the fourth transmission M4 and the fifth transmission M5 to ascertain that the one or more controllers 20 obtained the correct version of the new cryptographic key. Although FIG. 2 illustrates two transmissions M4 and M5, it is to be appreciated that FIG. 2 is merely exemplary in nature and the one or more controllers 20 may transmit the data items included as part of the fourth transmission M4 and fifth transmission M5 using any number of transmissions. It is also to be appreciated that the transmissions M4 and M5 do not need to be transmitted sequentially. However, the sender 22 receives all of the data items in the transmissions M4 and M5 first before verifying their validity.

In the exemplary embodiment as described and shown in Table 1, the authentication key is a 128-bit value and the new cryptographic key is a 256-bit value. However, it is to be appreciated that in another embodiment, both the authentication key and the new cryptographic key are 256-bit values. In the present embodiment, the first transmission M1, the second transmission, the third transmission M3, the fourth transmission M4, and the fifth transmission M5 are summarized in Table 1 below. In one embodiment, the first transmission M1 is a 128-bit value that is a concatenation of an identifier corresponding to the one or more controllers 20

(ECU_ID), a slot identifier of the new cryptographic key (NEW Key Slot ID), and the slot identifier of the authentication key (Key$_{AUTH}$ Slot ID). Although the first transmission M1 is described having a length of 128 bits with specific values, it is to be appreciated that the bit length and content of the first transmission M1 is not limited to the embodiment as shown in Table 1. It is also to be appreciated that the authentication key (Key$_{AUTH\ 128}$) may be set to either the current cryptographic key that requires updating or the master key.

In one embodiment, the second transmission M2 is a 384-bit value that is a symmetric key encryption under the key encryption key (K1$_{256}$) of a concatenation of a plurality of parameters and the new cryptographic key (New Key$_{256\ bit}$). Specifically, in one embodiment, the plurality of parameters includes a freshness counter value (Counter$_{28}$), a bit string flag identifier encoding of a list of operations the new cryptographic key may be used for (FID$_5$), and padding (0 . . . 0$_{95}$). Although the second transmission M2 is described having a length of 384 bits, it is to be appreciated that the bit length and content of the second transmission M2 is not limited to the embodiment as shown in Table 1, and the second transmission M2 may include any content that includes an encryption of the new cryptographic key, a freshness counter, and other application-dependent parameters. The symmetric key encryption is performed using a 256-bit key block cipher in an encryption mode of operation such as, for example, the advanced encryption standard with a 256-bit key (AES-256) in cipher block chaining (CBC) mode (AES$_{CBC}$), the key encryption key (K1$_{256}$) is a 256-bit value, the bit string flag identifier is a 5-bit value, and the padding is a 95-bit value. It is to be appreciated that the bit values described for the plurality of parameters are merely exemplary in nature and other bit values may be used as well. The bit string flag identifier is a bit mask that specifies what tasks the new cryptographic key may be used for, such as only for message authentication code verification, or for both message authentication code verification and message authentication code generation.

In embodiments where the cryptographic key update protocol is backward compatible, the last two padding bits of the padding (0 . . . 0$_{93}$XX) may be used to indicate the type of update. For example, in one implementation if the last two padding bits are "00", this indicates an update from a 128-bit cryptographic key to a 128-bit cryptographic key, if the past two padding bits are "01", this indicates an update from a 128-bit cryptographic key to a 256-bit cryptographic key, and if the last two padding bits are "10", this indicates an update from a 256-bit cryptographic key to a 256-bit cryptographic key. It is to be appreciated that more than two padding bits may be used as well in the event more combinations of cryptographic key sizes are required.

It is to be appreciated that the sender 22 (FIG. 1) derives the key encryption key (K1$_{256}$) by transforming the authentication key (Key$_{AUTH\ 128}$) and a bit string of constant values (KEY_UPDATE_ENC_CST) based on a one-way compression function (AES-COMPRESSION_FUNC), where the output of the one-way compression function is a 256-bit value. The one-way compression function is one of the following: a modification detection code 2 (MDC-2) cryptographic hash function with a 128-bit advanced encryption standard (AES-128) as the underlying block cipher, a modification detection code 4 (MDC-4) cryptographic hash function with the 128-bit advanced encryption standard (AES-128) as the underlying block cipher, the Hirose compression function with the 256-bit advanced encryption standard (AES-256) as the underlying block cipher, and a 256-bit hash function. Some examples of the 256-bit hash function include the secure hash algorithm 2 (SHA2-512) and the secure hash algorithm 3 (SHA3-512) truncated to 256 bits.

The third transmission M3 is a 128-bit message authentication code that is computed based on the advanced encryption standard cipher-based message authentication code (AES-CMAC) under the first MAC key (K2$_{128}$) of the concatenation of the first transmission M1 and the second transmission M2, where the first MAC key (K2$_{128}$) is a 128-bit value. The sender 22 derives the first MAC key (K2$_{128}$) by transforming the authentication key (Key$_{AUTH\ 128}$) and the bit string of constant values (KEY_UPDATE_ENC_CST) based on one of the following: the advanced encryption standard Miyaguchi-Preneel compression function (AES-MP) and a 128-bit hash function. Some examples of the 128-bit hash function include the secure hash algorithm 2 (SHA2-512) and the secure hash algorithm 3 (SHA3-512) truncated to 128 bits.

The one or more controllers 20 then verifies the message authentication code under the first MAC key (K2$_{128}$) of the concatenation of the first transmission M1 and the second transmission M2. In response to verifying the message authentication code under the first MAC key (K2$_{128}$) of the concatenation of the first transmission M1 and the second transmission M2, the one or more controllers 20 derive the key encryption key (K1$_{256}$) and extract the new cryptographic key (New Key$_{256\ bit}$) from the second transmission M2 based on the key encryption key (K1$_{256}$). In response to extracting the new cryptographic key (New Key$_{256\ bit}$), the one or more controllers 20 then compute the fourth transmission M4 and the fifth transmission M5 based on the new cryptographic key (New Key$_{256\ bit}$).

The fourth transmission M4 is a 256-bit bit string that is a concatenation of the first transmission M1 received from the sender 22 and a symmetric key encryption of the freshness counter value (Counter$_{28}$) in the second transmission M2 under a second encryption key (K3$_{128}$) and a symmetric key AES encryption (M4*$_{128}$) of the freshness counter value (Counter$_{28}$) in the second transmission M2 under the second encryption key (K3$_{128}$). The one or more controllers 20 derives the symmetric key AES encryption (M4*$_{128}$) by encrypting the freshness counter value (Counter$_{28}$) from the second transmission M2 based on the advanced encryption standard (AES) under the second encryption key (K3$_{128}$). The one or more controllers 20 derives the second encryption key (K3$_{128}$) by transforming the new cryptographic key (New Key$_{256\ bit}$) and the bit string of constant values (KEY_UPDATE_ENC_CST) based on one of the following: an advanced encryption standard Miyaguchi-Preneel compression function (AES-MP) and the 128-bit hash function.

The fifth transmission M5 is a 128-bit message authentication code under a second MAC key (K4$_{128}$) of the fourth transmission M4. Specifically, the 128-bit message authentication code is derived based on an advanced encryption standard cipher-based message authentication code (AES-CMAC). The one or more controllers 20 derives the second MAC key (K4$_{128}$) by transforming the new cryptographic key (New Key$_{256\ bit}$) and bit string of constant values (KEY_UPDATE_ENC_CST) based on one of the following: the advanced encryption standard Miyaguchi-Preneel compression function (AES-MP) and the 128-bit hash function.

9

TABLE 1

$$M1_{128\ bit} = \text{ECU\_ID} \mid \text{NEW Key Slot ID} \parallel \text{Key}_{AUTH}\ \text{Slot ID},$$
$$\text{where Key}_{AUTH\ 128} = \text{Old Key or Master Key}$$
$$M2_{384\ bit} = \text{AES}_{CBC}(K1_{256},\ \text{Counter}_{28} \parallel$$
$$FID_5 \parallel 0 \ldots 095\parallel \text{New Key}_{256\ bit}),\ \text{where}$$
$$K1_{256} = \text{AES-COMPRESSION\_FUNC}(\text{Key}_{AUTH\ 128}$$
$$\parallel \text{KEY\_UPDATE\_ENC\_CST})$$
$$M3_{128\ bit} = \text{AES-CMAC}(K2_{128},\ M1 \parallel M2)$$
$$\text{where } K2_{128} = \text{AES-MP}(\text{Key}_{AUTH\ 128} \parallel$$
$$\text{KEY\_UPDATE\_CMAC\_CST})$$
$$M4_{256\ bit} = M1_{128} \parallel M4^*{}_{128},\ \text{where}$$
$$M4^*{}_{128} = \text{AES}_{EBC}(K3_{128},\ \text{Counter}_{28}),\ \text{and}$$
$$K3_{128} = \text{AES-MP}(\text{NEW Key}_{256} \parallel$$
$$\text{KEY\_UPDATE\_ENC\_CST})$$
$$M5_{128\ bit} = \text{AES-CMAC}(K4_{128},\ M4),\ \text{where}$$
$$K4_{128} = \text{AES-MP}(\text{NEW Key}_{256} \parallel$$
$$\text{KEY\_UPDATE\_CMAC\_CST})$$

Figure 3:
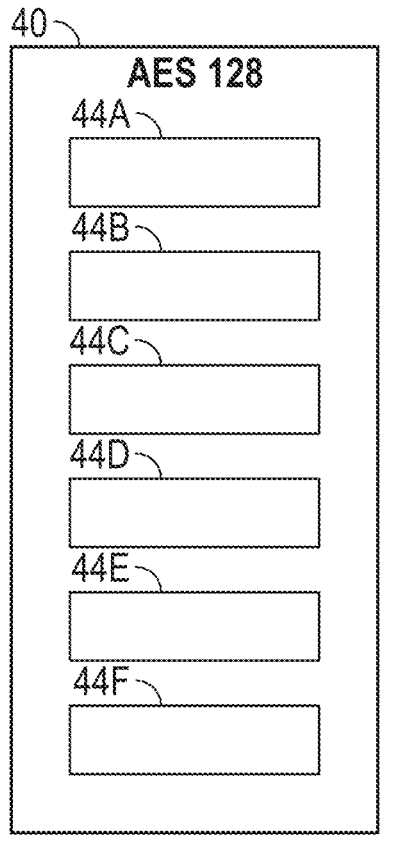
FIG. 3 illustrates two individual processing units that are implemented on both the one or more controllers and the sender shown in FIG. 1 according to the embodiment in Table 1, according to an exemplary embodiment.
Figure 3:
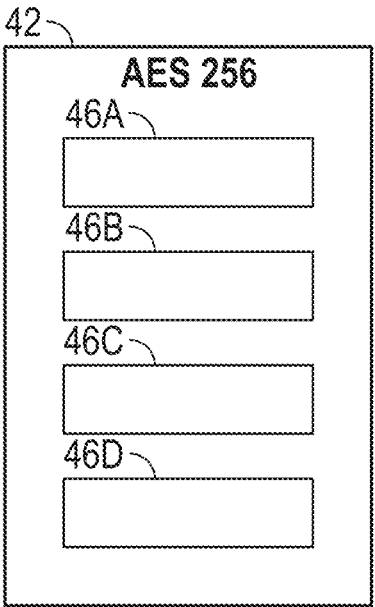
Figure 3:
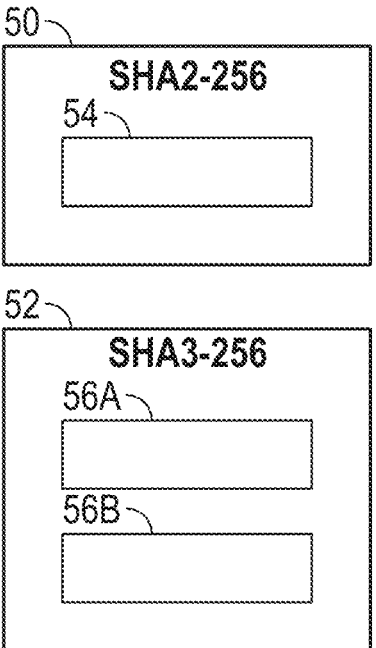

FIG. 3 is an illustration of four individual processing units 40, 42, 50, 52 that are implemented on both the one or more controllers 20 and the sender 22 shown in FIG. 1 (where the sender 22 is either the computer 24 located at the back-office 26 or the one or more trust anchor controllers 28). The individual processing unit 40 is based on the 128-bit advanced encryption standard (AES-128) and includes a plurality of cryptography operations modules 44A-44F that employ AES-128 as a sub-routine. Specifically, cryptography operation module 44A implements encoding functions, cryptography operation module 44B implements decoding functions, cryptography operation module 44C calculates cipher-based message authentication codes (CMAC), cryptography operation module 44D implements the advanced encryption standard Miyaguchi-Preneel compression function (AES-MP), cryptography operation module 44E implements the MDC-2 cryptographic hash function, and cryptography operation module 44F implements the MDC-4 cryptographic hash function. The individual processing unit 42 is based on the 256-bit advanced encryption standard (AES-256) and includes a plurality of cryptography operations modules 46A-46D. Specifically, cryptography operation module 46A implements encoding operations, cryptography operation module 46B implements decoding operations, cryptography operation module 46C executes the advanced encryption standard Miyaguchi-Preneel compression function (AES-MP), and cryptography operation module 46D executes the Hirose compression function. The individual processing units 50, 52 are described below.

Figure 4:
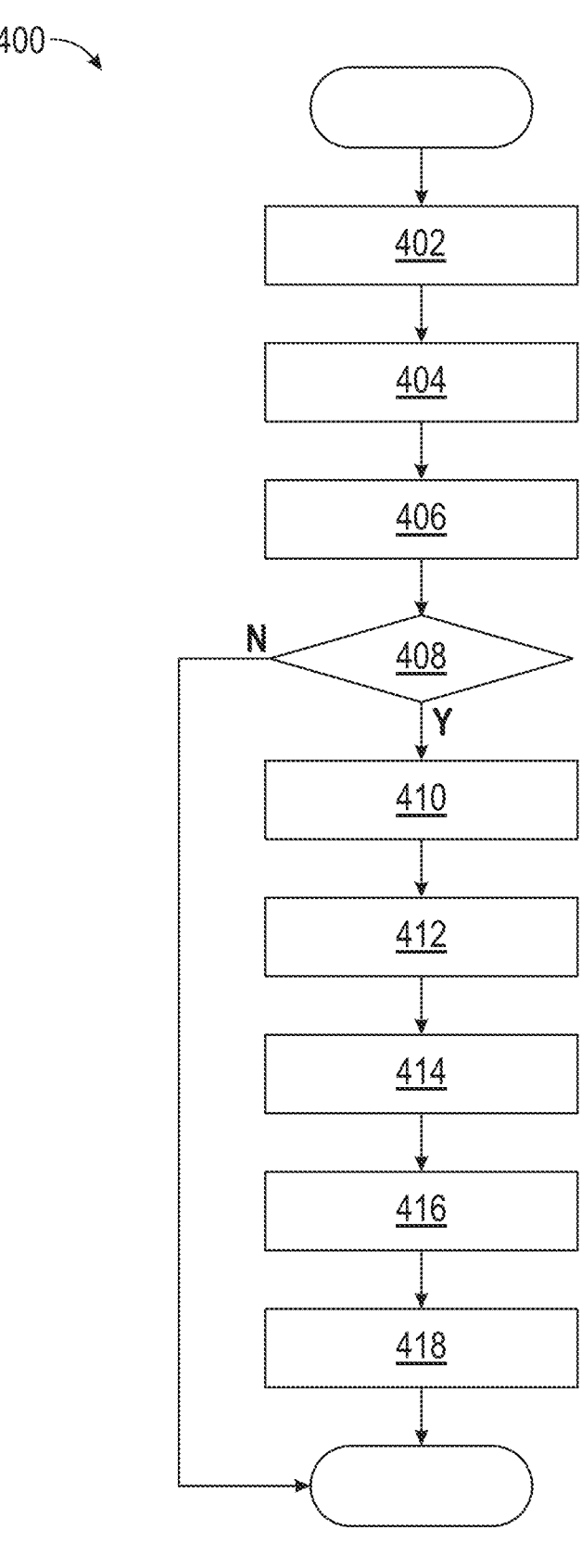
FIG. 4 is a process flow diagram illustrating a method for updating 256-bit cryptographic keys by the cryptographic key update system based on the embodiment shown in Table 1, according to an exemplary embodiment.

FIG. 4 illustrates an exemplary process flow diagram illustrating a method 400 for updating either old 128-bit or 256-bit cryptographic keys based on the embodiment of the cryptographic key update system 12 shown in Table 1. Referring to FIGS. 1, 2, and 4, the method 400 begins at block 402. In block 402, the sender 22 transmits the first transmission M1 to the one or more controllers 20. The sender 22 determines the first transmission, which includes the concatenation of the identifier corresponding to the one or more controllers 20 (ECU_ID), the slot identifier of the new cryptographic key (NEW Key Slot ID), and the slot identifier of the authentication key (Key$_{AUTH}$ Slot ID). The method 400 may then proceed to block 404.

In block 404, the sender 22 transmits the second transmission M2 to the one or more controllers 20, where the second transmission is symmetric key encryption under the key encryption key (K1$_{256}$) of a concatenation of a plurality of parameters and the new cryptographic key (New Key$_{256\ bit}$). The method 400 may then proceed to block 406.

In block 406, the sender 22 transmits the third transmission M3 to the one or more controllers 20, where the third transmission M3 is a 128-bit advanced encryption standard cipher-based message authentication code (AES-CMAC) under the first MAC key (K2$_{128}$) of the concatenation of the first transmission M1 and the second transmission M2. The method 400 may then proceed to decision block 408.

In decision block 408, the one or more controllers 20 verify the data transmitted by the transmissions M1, M2, and M3. In response to determining the data transmitted by the transmissions M1, M2, and M3 is valid, the method 400 may proceed to block 410. Otherwise, the method 400 may terminate.

In block 410, in response to determining the data transmitted by the transmissions M1, M2, and M3 is valid, the one or more controllers 20 extract the new cryptographic key (New Key$_{256\ bit}$). The method 400 may then proceed to block 412.

In block 412, the one or more controllers 20 transmits the fourth transmission M4 to the sender 22. The fourth transmission M4 is a 256-bit string that is a concatenation of the first transmission M1 received from the sender 22 and a symmetric key AES encryption (M4*$_{128}$) of the freshness counter value (Counter$_{28}$) in the second transmission M2 under a second encryption key (K3$_{128}$). The method 400 may then proceed to block 414.

In block 414, the one or more controllers 20 transmits the fifth transmission M5 to the sender 22. The fifth transmission M5 is a 128-bit message authentication code under the second MAC key (K4$_{128}$) of the fourth transmission M4. The method 400 may then proceed to block 416.

In block 416, the sender 22 receives the fourth transmission M4 and the fifth transmission M5 from the one or more controllers 20. The method 400 may then proceed to block 418.

In block 418, in response to receiving the fourth transmission M4 and the fifth transmission M5, the sender 22 verifies the fourth transmission M4 and the fifth transmission M5 to ascertain that the one or more controllers 20 obtained the correct version of the new cryptographic key (New Key$_{256\ bit}$). The method 400 may then terminate.

In the embodiment as described and shown in Table 1, the fourth transmission M4 and the fifth transmission M5 are both under 128-bit cryptographic keys (i.e., the fourth transmission M4 is under the second encryption key (K3$_{128}$), which is a 128-bit value, and the fifth transmission M5 is under the second MAC key (K4$_{128}$), which is a 128-bit value). It is to be appreciated that the embodiment as shown in Table 1 may be used in instances when offline attacks are not a concern. However, in instances when offline attacks on the message authentication codes may be a concern, and specifically when there is a risk of an offline attack on the fifth transmission to recover the new cryptographic key to forage a 128-bit message authentication code, then the fifth transmission M5 is set to be a 256-bit message authentication code as described below and shown in Table 2.

In the exemplary embodiment as described and shown in Table 2, the current cryptographic key is a 128-bit value and the new cryptographic key is a 256-bit value. Referring to FIGS. 1 and 2 and Table 2, the first transmission M1, the second transmission, the third transmission M3, and the fourth transmission M4 include the same data items as the embodiment described in Table 1. The fifth transmission M5 is a 256-bit message authentication code under the second MAC key (K4$_{256}$) of the fourth transmission M4, where the 256-bit message authentication code is derived based on a 256-bit message authentication code function. Some examples of the 256-bit message authentication code function include, but are not limited to, a Keccak message authentication code (KMAC-256( )) and a hash-based message authentication code (HMAC-256( )). The one or more controllers 20 derives the second MAC key ($K4_{128}$) by transforming the new cryptographic key (New $Key_{256\ bit}$) and bit string of constant values (KEY_UPDATE_ENC_CST) based on one of the following 256-bit compression functions (AES-COMPRESSION_FUNC): the MDC-2 cryptographic hash function with the AES-128 as the underlying block cipher, the MDC-4 modification detection code with the AES-128 as the underlying block cipher, and the Hirose compression function with the AES-256 as the underlying block cipher.

TABLE 2

M1$_{128\ bit}$ = ECU_ID || NEW Key Slot ID || Key$_{AUTH}$
Slot ID, where Key$_{AUTH\ 128}$ = Old Key or Master Key
M2$_{384\ bit}$ = AES$_{CBC}$(K1$_{256}$, Counter$_{28}$ || FID$_5$ || 0 ... 095||
New Key$_{256\ bit}$), where
K1$_{256}$ = AES-COMPRESSION_FUNC(Key$_{AUTH\ 128}$ ||
KEY_UPDATE_ENC_CST)
M3$_{128\ bit}$ = AES-CMAC(K2$_{128}$, M1 || M2)
where K2$_{128}$ = AES-MP(Key$_{AUTH\ 128}$ ||
KEY_UPDATE_CMAC_CST)
M4$_{256\ bit}$ = M1$_{128}$ || M4*$_{128}$, where
M4*$_{128}$ = AES$_{EBC}$(K3$_{128}$, Counter$_{28}$), and
K3$_{128}$ = AES-MP(NEW Key$_{256}$ ||
KEY_UPDATE_ENC_CST)
M5$_{256\ bit}$ = 256-bit-MAC-FUNC(K4$_{256}$, M4)
Where:
K4$_{256}$ = AES-COMPRESSION_FUNC (NEW Key$_{256}$ ||
KEY_UPDATE_CMAC_CST), and
256-bit-MAC-FUNC( ) is implemented as KMAC-256( ),
HMAC-256( ), or similar.

Figure 5:
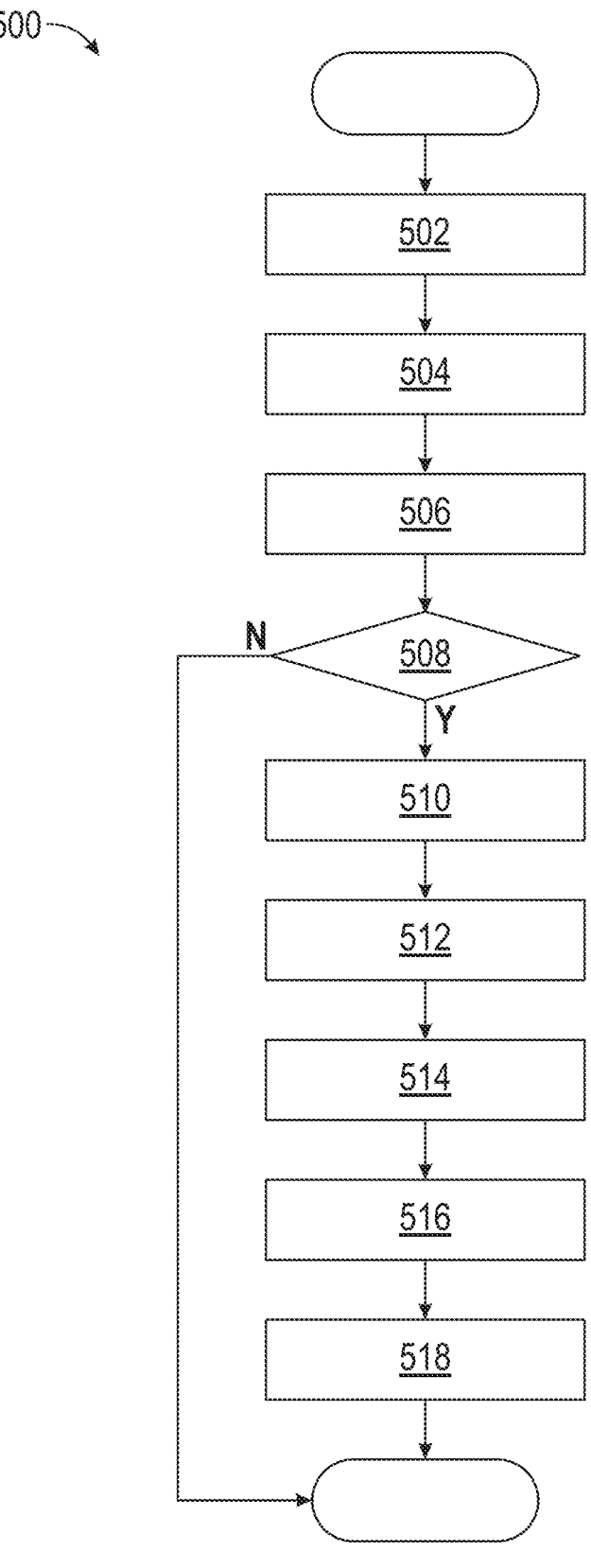
FIG. 5 is a process flow diagram illustrating another method for updating 256-bit cryptographic keys by the cryptographic key update system based on the embodiment in Table 2, according to an exemplary embodiment.

FIG. 5 illustrates an exemplary process flow diagram illustrating a method 500 for updating old 128-bit to 256-bit cryptographic keys based on the embodiment of the cryptographic key update system 12 shown in Table 2 where the fifth transmission is a 256-bit message authentication code. Referring to FIGS. 1, 2, and 5, the method 500 begins at block 502. In block 502, the sender 22 transmits the first transmission M1 to the one or more controllers 20. The sender 22 determines the first transmission, which includes the concatenation of the identifier corresponding to the one or more controllers 20 (ECU_ID), the slot identifier of the new cryptographic key (NEW Key Slot ID), and the slot identifier of the authentication key (Key$_{AUTH}$ Slot ID). The method 500 may then proceed to block 504.

In block 504, the sender 22 transmits the second transmission M2 to the one or more controllers 20, where the second transmission is symmetric key encryption under the key encryption key ($K1_{256}$) of a concatenation of a plurality of parameters and the new cryptographic key (New $Key_{256\ bit}$). The method 500 may then proceed to block 506.

In block 506, the sender 22 transmits the third transmission M3 to the one or more controllers 20, where the third transmission M3 is a 128-bit advanced encryption standard cipher-based message authentication code (AES-CMAC) under the first MAC key ($K2_{128}$) of the concatenation of the first transmission M1 and the second transmission M2. The method 500 may then proceed to decision block 508.

In decision block 508, the one or more controllers 20 verify the data transmitted by the transmissions M1, M2, and M3. In response to determining the data transmitted by the transmissions M1, M2, and M3 is valid, the method 500 may proceed to block 510. Otherwise, the method 500 may terminate.

In block 510, in response to determining the data transmitted by the transmissions M1, M2, and M3 is valid, the one or more controllers 20 extract the new cryptographic key (New $Key_{256\ bit}$). The method 500 may then proceed to block 512.

In block 512, the one or more controllers 20 transmits the fourth transmission M4 to the sender 22. The fourth transmission M4 is a 256-bit bit string that is a concatenation of the first transmission M1 received from the sender 22 and a symmetric key AES encryption (M4*$_{128}$) of the freshness counter value (Counter$_{28}$) in the second transmission M2 under a second encryption key ($K3_{128}$). The method 500 may then proceed to block 514.

In block 514, the one or more controllers 20 transmits the fifth transmission M5 to the sender 22. The fifth transmission M5 is a 256-bit message authentication code under the second MAC key ($K4_{256}$) of the fourth transmission M4, where the 256-bit message authentication code is derived based on a 256-bit message authentication code function. The method 500 may then proceed to block 516.

In block 516, the sender 22 receives the fourth transmission M4 and the fifth transmission M5 from the one or more controllers 20. The method 500 may then proceed to block 518.

In block 518, in response to receiving the fourth transmission M4 and the fifth transmission M5, the sender 22 verifies the fourth transmission M4 and the fifth transmission M5 to ascertain that the one or more controllers 20 obtained the correct version of the new cryptographic key (New $Key_{256\ bit}$). The method 500 may then terminate.

In the exemplary embodiment as described and shown in Table 3, both the key and the new cryptographic key are 256-bit values. Referring to FIGS. 1 and 2 and Table 3, the first transmission M1, the second transmission, the fourth transmission M4, and the fifth transmission M5 include the same data items as the embodiment described in Table 2, except that the authentication key (Key$_{AUTH\ 256}$) is a 256-bit value and the third transmission M3 is a 256-bit message authentication code.

The third transmission M3 is a 256-bit message authentication code under the first MAC key ($K2_{256}$) of the concatenation of the first transmission M1 and the second transmission M2. The sender 22 derives the first MAC key ($K2_{256}$) by transforming the authentication key (Key$_{AUTH\ 128}$) and the bit string of constant values (KEY_UPDATE_ENC_CST) based on one of the following 256-bit compression functions: the MDC-2 cryptographic hash function with the AES-128 as the underlying block cipher, the MDC-4 cryptographic hash function with the AES-128 as the underlying block cipher, and the Hirose compression function with the AES-256 as the underlying block cipher. The 256-bit message authentication code in the third transmission M3 is computed based on a 256-bit message authentication code function. As mentioned above, some examples of the 256-bit message authentication code function include, but are not limited to, a Keccak message authentication code (KMAC-256( )) and a hash-based message authentication code (HMAC-256( )).

TABLE 3

M1$_{128\ bit}$ = ECU_ID || NEW Key Slot ID || Key$_{AUTH}$ Slot ID,
where Key$_{AUTH\ 256}$ = Old Key or Master Key
M2$_{384\ bit}$ = AES$_{CBC}$(K1$_{256}$, Counter$_{28}$ ||
FID$_5$ || 0 . . . 095|| New Key$_{256\ bit}$), where
K1$_{256}$ = AES-COMPRESSION_FUNC(Key$_{AUTH\ 256}$ ||
KEY_UPDATE_ENC_CST)
M3$_{256\ bit}$ = $_{256}$-bit-MAC-FUNC (K2$_{256}$, M1 ||M2)
where:
K2$_{256}$ = AES-COMPRESSION_FUNC (Key$_{AUTH\ 256}$ ||

TABLE 3-continued

```
KEY_UPDATE_CMAC_CST), and
256-bit-MAC-FUNC( ) = KMAC-256( ), HMAC-256( ), or similar.
M4_{256 bit} = M1_{128} || M4*_{128}, where
M4*_{128} = AES_{EBC}(K3_{128}, Counter_{28}), and
K3_{128} = AES-MP(NEW Key_{256} || KEY_UPDATE_ENC_CST)
M5_{256 bit} = 256-bit-MAC-FUNC(K4_{256}, M4)
Where:
K4_{256} = AES-COMPRESSION_FUNC (NEW Key_{256} ||
KEY_UPDATE_CMAC_CST), and
256-bit-MAC-FUNC( ) is implemented as
KMAC-256( ), HMAC-256( ), or similar.
```

Figure 6:
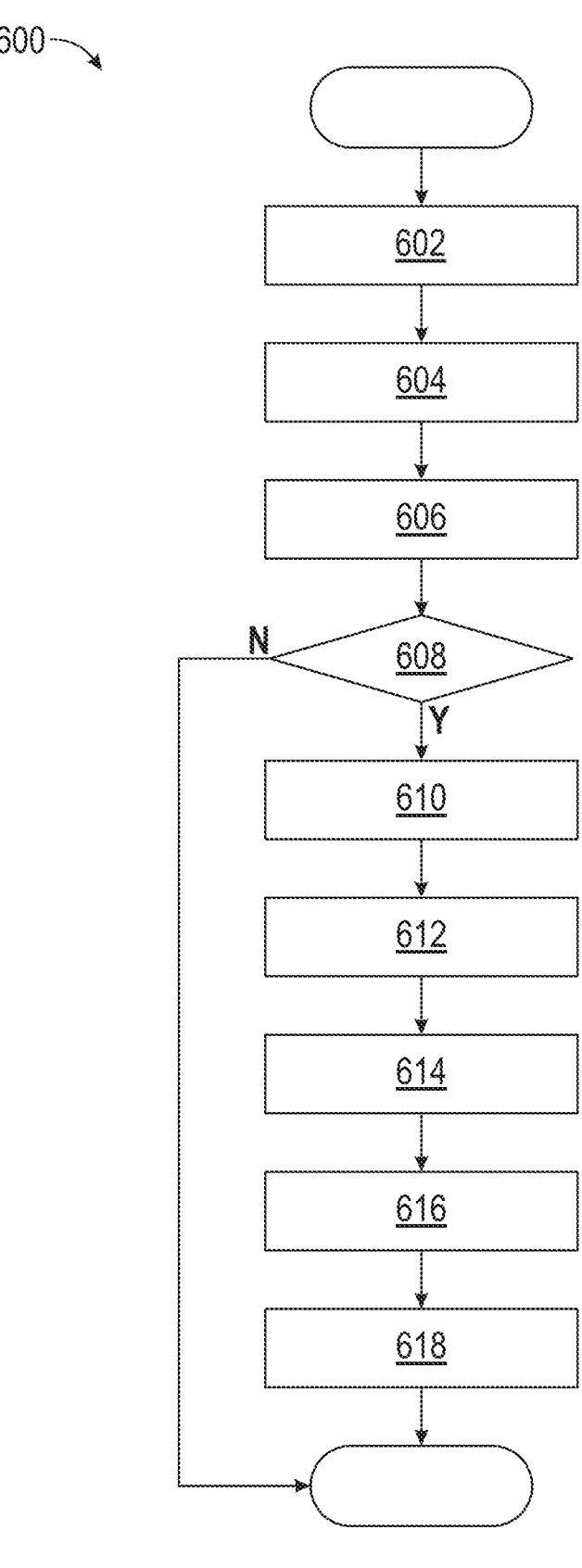
FIG. 6 is a process flow diagram illustrating another method for updating 256-bit cryptographic keys by the cryptographic key update system based on the embodiment in Table 3, according to an exemplary embodiment.

FIG. 6 illustrates an exemplary process flow diagram illustrating a method 600 for updating 256-bit cryptographic keys based on the embodiment of the cryptographic key update system 12 shown in Table 3 where the third transmission M3 is a 256-bit message authentication code. Referring to FIGS. 1, 2, and 6, the method 600 begins at block 602. In block 602, the sender 22 transmits the first transmission M1 to the one or more controllers 20. The sender 22 determines the first transmission, which includes the concatenation of the identifier corresponding to the one or more controllers 20 (ECU_ID), the slot identifier of the new cryptographic key (NEW Key Slot ID), and the slot identifier of the authentication key (Key_{AUTH} Slot ID). The method 600 may then proceed to block 604.

In block 604, the sender 22 transmits the second transmission M2 to the one or more controllers 20, where the second transmission is symmetric key encryption under the key encryption key (K1_{256}) of a concatenation of a plurality of parameters and the new cryptographic key (New Key_{256 bit}). The method 600 may then proceed to block 606.

In block 606, the sender 22 transmits the third transmission M3 to the one or more controllers 20, where the third transmission M3 is a 256-bit message authentication code under the first MAC key (K2_{256}) of the concatenation of the first transmission M1 and the second transmission M2, where the first MAC key (K2_{256}) is a 256-bit value. The method 600 may then proceed to decision block 608.

In decision block 608, the one or more controllers 20 verify the data transmitted by the transmissions M1, M2, and M3. In response to determining the data transmitted by the transmissions M1, M2, and M3 is valid, the method 600 may proceed to block 610. Otherwise, the method 600 may terminate.

In block 610, in response to determining the data transmitted by the transmissions M1, M2, and M3 is valid, the one or more controllers 20 extract the new cryptographic key (New Key_{256 bit}). The method 600 may then proceed to block 612.

In block 612, the one or more controllers 20 transmits the fourth transmission M4 to the sender 22. The fourth transmission M4 is a 256-bit bit string that is a concatenation of the first transmission M1 received from the sender 22 and a symmetric key AES encryption (M4*_{128}) of the freshness counter value (Counter_{28}) in the second transmission M2 under a second encryption key (K3_{128}). The method 600 may then proceed to block 614.

In block 614, the one or more controllers 20 transmits the fifth transmission M5 to the sender 22. The fifth transmission M5 is a 256-bit message authentication code under the second MAC key (K4_{256}) of the fourth transmission M4, where the 256-bit message authentication code is derived based on a 256-bit message authentication code function. The method 600 may then proceed to block 616.

In block 616, the sender 22 receives the fourth transmission M4 and the fifth transmission M5 from the one or more controllers 20. The method 600 may then proceed to block 618.

In block 618, in response to receiving the fourth transmission M4 and the fifth transmission M5, the sender 22 verifies the fourth transmission M4 and the fifth transmission M5 to ascertain that the one or more controllers 20 obtained the correct version of the new cryptographic key (New Key_{256 bit}). The method 600 may then terminate.

Referring back to FIG. 3, the individual processing units 50, 52 are implemented on both the one or more controllers 20 and the sender 22 shown in FIG. 1 (where the sender 22 is either the computer 24 located at the back-office 26 or the one or more trust anchor controllers 28) when the fifth transmission M5 include a 256-bit message authentication code, or when both the third transmission M3 and the fifth transmission M5 include 256-bit message authentication codes. Specifically, the individual processing unit 50 is based on the secure hash algorithm 2 (SHA2-256) that produces a 256-bit digest and includes cryptography operation module 54 for computing the HMAC-256( ) authentication code function. In embodiments where either the KMAC-256( ) authentication code function or both the HMAC-256( ) and the KMAC-256( ) authentication code functions are executed, the individual processing unit 52 may be employed. The individual processing unit 52 is based on the secure hash algorithm 3 (SHA3-256) that produces a 256-bit digest and includes cryptography operation 56A for executing the HMAC-256( ) authentication code function and cryptography operation 56B for executing the KMAC-256( ) authentication code functions.

Referring generally to FIGS. 1-6, the disclosed cryptographic key update system for updating 256-bit cryptographic keys provides various technical effects and benefits. Specifically, the disclosed cryptographic key update system provides an approach for updating 256-bit cryptographic keys at 256-bit transport security. It is to be appreciated that the cryptographic key update protocol is backward compatible and may also support updating a 128-bit cryptographic key to a 256-bit cryptographic key. The cryptographic key update system provides an approach to update current systems, which are based on 128-bit cryptographic keys, to satisfy post-quantum security requirements.

In yet another embodiment as shown in Table 4, the new cryptographic key includes an arbitrary bit length that is greater than 256 bits. Specifically, in one embodiment, the current cryptographic key is a P-bit value, the new cryptographic key is an N-bit value, the value of N is greater than 256 (N>256), and the value P is less than the value N. However, it is to be appreciated that in an alternative embodiment both the current cryptographic key and the new cryptographic key are N-bit values. In other words, the current cryptographic key includes a bit length that is either less than or equal to the bit length of the new cryptographic key. It is also to be appreciated that the cryptographic key update protocol described in Table 4 below is backward compatible in instances when the value P is less than the value N (P<N).

Referring to FIGS. 1-2 and Table 4, the first transmission M1 includes the same data as the embodiment as described in Table 1, however, it is to be appreciated that the authentication key (Key_{AUTH P}) is a P-bit value or, in the alternative, an N-bit value (Key_{AUTH N}). The authentication key (Key_{AUTH P}) may be set to the current cryptographic key that requires updating or to the master key.

In one embodiment, the second transmission M2 is an (N+B)-bit value, where the value B is an integer and the value N is a multiple of the value B. For example, in one embodiment, the value of B is 128, or B=128. Although the second transmission M2 is described having a length of N+B bits, it is to be appreciated that the bit length and content of the second transmission M2 is not limited to the embodiment as shown in Table 4, and the second transmission M2 may include any content that includes an encryption of the new cryptographic key, a freshness counter, and other application-dependent parameters. The second transmission M2 is a symmetric key encryption under the key encryption key $(K1_N)$ of a concatenation of the plurality of parameters and the new cryptographic key (New $Key_{N\ bit}$), where the plurality of parameters includes the freshness counter value $(Counter_{28})$, the bit string flag identifier encoding of a list of operations the new cryptographic key may be used for $(FID_5)$, and the padding $(0 \ldots 0_{95})$. The symmetric key encryption is performed using a block cipher having a block size of B bits. For example, in one embodiment, the block cipher is in the cipher block chaining (CBC) mode (Block-$Cipher_{CBC}$). In the embodiment as described in Table 4, the key encryption key $(K1_N)$ is an N-bit value, the bit string flag identifier is a 5-bit value, and the padding is a 95-bit value. It is to be appreciated that the bit values described for the bit string flag identifier and the padding are merely exemplary in nature and other bit values may be used as well. It is to be appreciated that the sender 22 (FIG. 1) derives the key encryption key $(K1_N)$ by transforming a concatenation of the authentication key and the bit string of constant values $(Key_{AUTH\ P}\|KEY\_UPDATE\_ENC\_CST)$ based on an N-bit compression function 70, which is illustrated in FIG. 7 and is described below.

Figure 7:
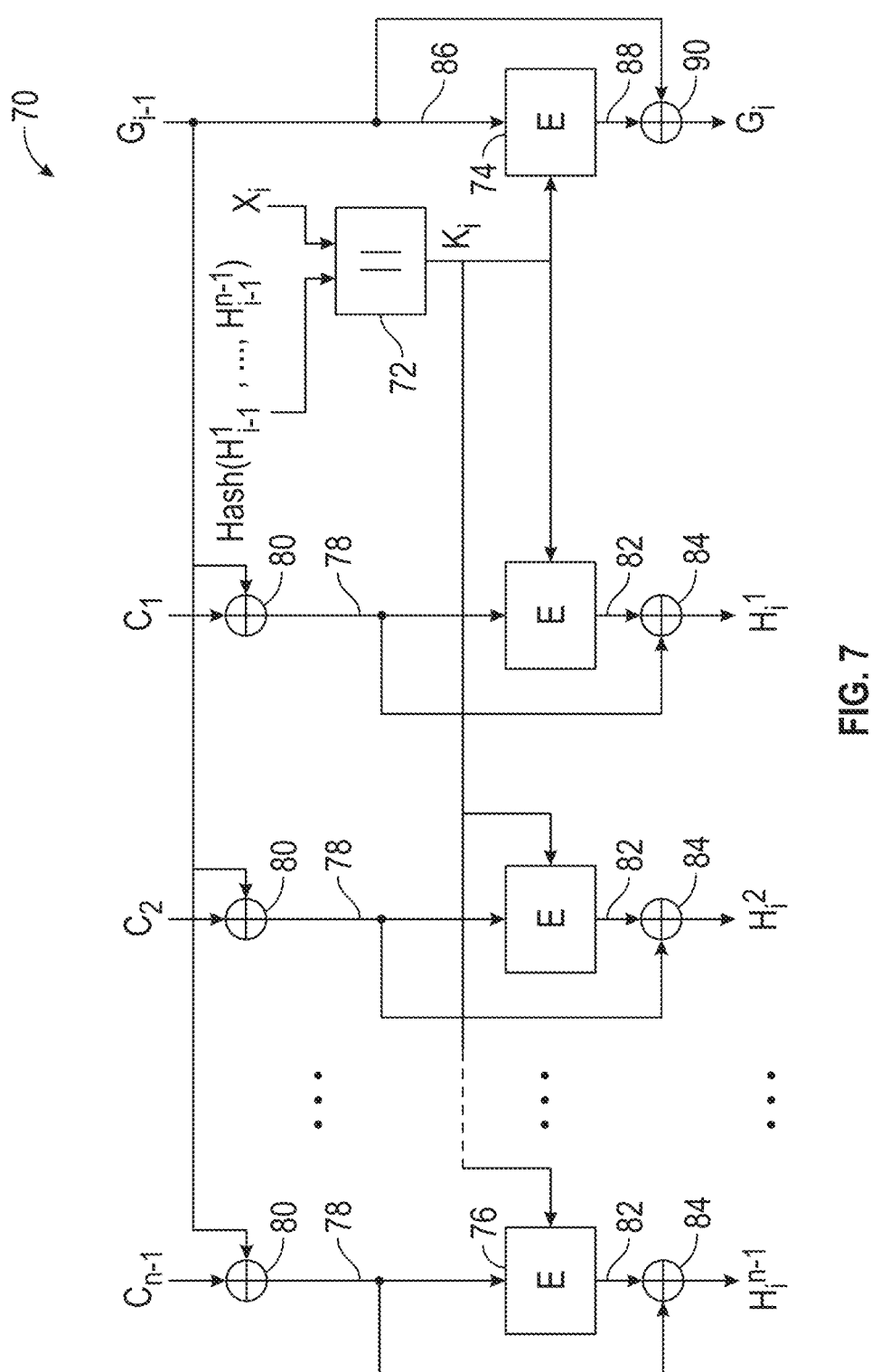
FIG. 7 is an N-bit compression function that is implemented by the cryptographic key update system when employing the embodiment shown in Table 4, according to an exemplary embodiment.

Referring now to FIG. 7, the N-bit compression function 70 receives an input X and determines an output having an N-bit value, where the input X is a concatenation of the authentication key and the bit string of constant values $(Key_{AUTH\ P}\|KEY\_UPDATE\_ENC\_CST)$, and the output is the key encryption key $(K1_N)$. The input X includes an arbitrary bit length that is greater than 256 bits. The N-bit compression function 70 includes an n number of block ciphers E, where each block cipher E includes a B-bit block size and a k-bit key size. The key size of each block cipher E is greater than the block size, or k>B. Thus, the number n of block ciphers E is equal to the bit length of the output of the N-bit compression function 70 divided by the block size B of each block cipher E, or $$n = \frac{N}{B}.$$

The input X is divided into an l number of blocks, which each block includes a t-bit block size, or $(X=X_1\| \ldots \|X_l)$. In the embodiment as described, the value t is equal to 128 bits. However, the value of t may include other values as well so long as the value t is less than the key size k of the block ciphers E. It is to be appreciated that the N-bit compression function completes a number of rounds to determine the output having the N-bit value, where the number of rounds is equal to the number of blocks l that the input X is divided into. In the following, each round is indexed by the value i where $1 \le i \le l$. The compression function 70 processes one of the l number of blocks of the input X during each round.

The N-bit compression function 70 receives a first output parameter $G_{i-1}$ and a second output parameter $$\left(H_{i-1}^1, \ldots, H_{i-1}^{n-1}\right).$$

At round i, a concatenation block 72 concatenates the input $k_i$ and a hash of the first output parameter $$\left(H_{i-1}^1, \ldots, H_{i-1}^{n-1}\right)$$

to produce a corresponding key $k_i$ for each block cipher E, or $$k_i = \mathrm{Hash}\left(H_{i-1}^1, \ldots, H_{i-1}^{n-1}\right)\|X_i.$$

It is to be appreciated that instead of concatenating the input $X_i$ with the hash of the first output parameter $$\left(H_{i-1}^1, \ldots, H_{i-1}^{n-1}\right),$$

in another embodiment the concatenation block 72 may replace the hash function with advanced encryption standard Miyaguchi-Preneel compression function (AES-MP) when the value k is equal to 256 and the value of t is equal to 128. In another embodiment, when the value k is equal to 384 and the value of t is equal to 128, the concatenation block 72 may replace the hash function with one of the following one-way compression functions: the modification detection code 2 (MDC-2) cryptographic hash function, the modification detection code 4 (MDC-4) cryptographic hash function, and the Hirose compression function.

The N-bit compression function first initializes the first output parameter $G_{i-1}$ and the second output parameter $$\left(H_{i-1}^1, \ldots, H_{i-1}^{n-1}\right)$$

or $$G_0, H_0^1, \ldots, H_0^{n-1},$$

or zero. The N-bit compression function completes an l number of rounds (equal to the number of blocks l that the input X is divided into) to determine the output having the N-bit value. The first output parameter $G_i$ at the $i^{th}$ round of the N-bit compression function is the exclusive or function (XOR) of the second output parameter $G_{i-1}$ from the previous round of the N-bit compression function and a symmetric key encryption of the first output parameter $G_{i-1}$ at the previous round of the N-bit compression function under the corresponding key $k_i$, or $G_i = G_{i-1} \oplus E(k_i, G_{i-1})$. As mentioned above, the N-bit compression function 70 includes an n number of block ciphers E, where a first block cipher 74 receives the first output parameter $G_{i-1}$ and j represents an index of the remaining portion of the block ciphers E included by the N-bit compression function 70, or $1 \le j \le n-1$.

17

18

As seen in FIG. 7, an $n^{th}$ block cipher 76 receives the constant $c_{n-1}$. For $1 \le j \le n-1$, the $j^{th}$ first output parameter $H_i^j$ at the $i^{th}$ round of the N-bit compression function is the exclusive or function (XOR) of the exclusive or function (XOR) of the first output parameter $G_{i-1}$ at the previous round of the N-bit compression function and the $j^{th}$ constant $c_j$, and a symmetric key encryption of the $j^{th}$ constant $c_j$ exclusive or under the corresponding key $k_i$, or $$H_i^j = G_{i-1} \oplus c_j \oplus E(k_i, G_{i-1} \oplus c_j),$$

for $1 \le j \le n-1$.

For each round i, each block cipher E except the first block cipher 74 receives the corresponding key $k_i$ and corresponding plaintext 78, where the corresponding plaintext 78 is an output of a corresponding exclusive or function 80 (XOR) of the $j^{th}$ constant $c_j$ and the first output parameter $G_{i-1}$ at the previous round of the N-bit compression function. Each block cipher E except the first block cipher 74 determines a ciphertext 82. The ciphertext 82 and the corresponding plaintext 78 corresponding to each block cipher E except the first block cipher 74 are combined at an exclusive or function (XOR) 84 to determine a corresponding output $$H_i^j,$$

where $1 \le j \le n-1$. The first block cipher 74 receives the corresponding key $k_i$ and plaintext 86, where the plaintext 86 is the first output parameter $G_{i-1}$ at the previous round of the N-bit compression function. The first block cipher 74 determines a ciphertext 88. The ciphertext 88 and the plaintext 86 are combined at an exclusive or function (XOR) 90 to determine an output $G_i$. At round 1, the N-bit compression function concatenates the output of each block cipher E to determine the output having the N-bit value, where the output is expressed as $$G_\ell \| H_\ell^1 \| \dots \| H_\ell^{n-1}.$$

Referring back to FIGS. 1-2 and Table 4, the third transmission M3 is an N-bit message authentication code that is computed based on an N-bit message authentication code function, which is described below, under a first MAC key ($K2_N$) of the concatenation of the first transmission M1 and the second transmission M2, where the first MAC key ($K2_N$) is an N-bit value. The sender 22 derives the first MAC key ($K2_N$) by transforming the authentication key ($Key_{AUTH\ P}$) and the bit string of constant values (KEY_UP-DATE_ENC_CST) based on the N-bit message authentication code function.

The N-bit message authentication code function employs the sponge construction and takes two inputs, a MAC key (such as the first MAC key $K2_N$) and a data payload having an arbitrary bit length (i.e., in the present embodiment the data payload is a concatenation of the first transmission M1 and the second transmission M2). The N-bit message authentication code determines an output bit stream having an N-bit length (i.e., the third transmission M3 having a bit length of N). The N-bit message authentication code function includes a capacity c, a rate r, and a permutation function $f$. The capacity c of the N-bit message authentication code function is set to twice the bit length of the N-bit message authentication code function, or 2N to ensure N-bit security. The rate r of the N-bit message authentication code function is set to one of the following: the one thousand six hundred minus the capacity c (1600-c) when the value of N is less than eight hundred (N<800), and to a value $q \ge 1$ when the value of N is greater to or equal to eight hundred, where q represents the size of elementary chunks of the input data processed at a time by the N-bit message authentication code function. The value of q is selected to find a balance between or optimize two factors. The two factors include the computational requirements associated with executing the permutation function $f$ and a number of times the sender 22 executes the permutation function $f$ during a run of the sponge construction. Increasing the value q results in an increase of the computational requirements associated with executing the permutation function $f$ while decreasing the value q results in increasing the number of times the sender 22 executes the permutation function $f$ during a run of the sponge construction.

The permutation function $f$ is set to the Keccak-p permutation including a width of one thousand six hundred and the number of internal rounds is set to twenty-four when the bit length N of the N-bit message authentication code function is less than eight hundred, or (Keccak-p[1600,24]) if N<800. Otherwise, when the bit length N of the N-bit message authentication code function is equal to or greater than eight hundred the permutation function $f$ is set to the Keccak-p permutation including a width of the capacity c plus the rate r or c+r and the number of internal rounds is set to $$12 + 2 \ \log_2\left(\frac{c+r}{25}\right),$$

or $$\left( Keccak - p\left[ c + r, \ 12 + 2 \ \log_2\left(\frac{c+r}{25}\right) \right] \right).$$

The fourth transmission M4 is a (128+B)-bit bit string that is a concatenation of the first transmission M1 received from the sender 22 and a symmetric key encryption ($M4*_N$) of the freshness counter value ($Counter_{2S}$) in the second transmission M2 under the second encryption key ($K3_N$). The one or more controllers 20 derives the symmetric key encryption ($M4*_N$) by encrypting the freshness counter value ($Counter_{2S}$) from the second transmission M2 based on a block cipher under the second encryption key ($K3_N$). For example, in one embodiment, the block cipher is in the cipher block chaining (CBC) mode ($BlockCipher_{CBC}$). The one or more controllers 20 derives the second encryption key ($K3_N$) by transforming the new cryptographic key (New $Key_{N\ bit}$) and the bit string of constant values (KEY_UPDA-TE_ENC_CST) based on the N-bit compression function 70 shown in FIG. 7.

The fifth transmission M5 is an N-bit message authentication code under a second MAC key ($K4_N$) of the fourth transmission M4. Specifically, the N-bit message authentication code is derived based on the N-bit message authentication code function. The one or more controllers 20 derives the second MAC key ($K4_N$) by transforming the new cryptographic key (New $Key_{N\ bit}$) and the bit string of constant values (KEY_UPDATE_ENC_CST) based on the N-bit compression function 70 shown in FIG. 7.

TABLE 4

Figure 8:
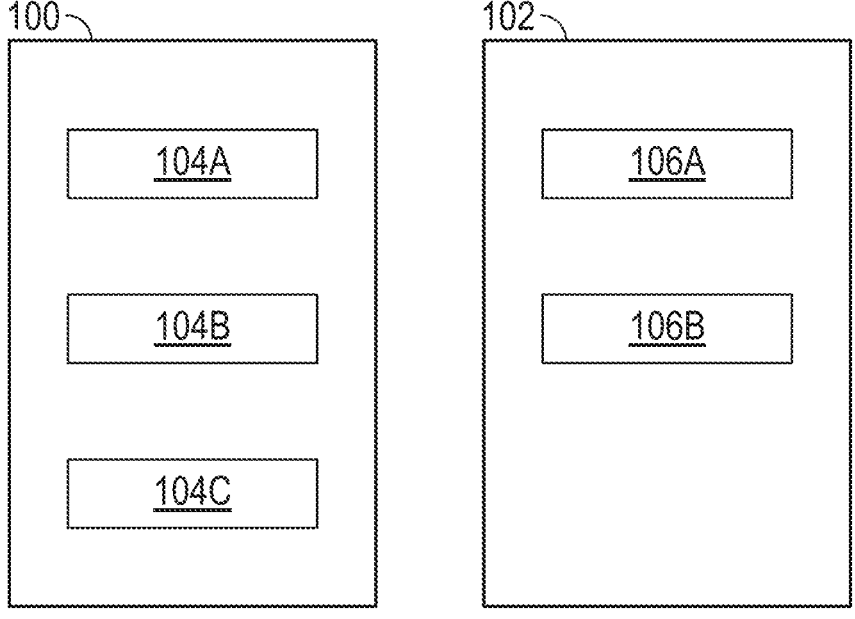
FIG. 8 illustrates two individual processing units that are implemented on both the one or more controllers and the sender shown in FIG. 1 according to the embodiment in Table 4, according to an exemplary embodiment.

$M1_{128\ bit}$ = ECU_ID || NEW Key Slot ID ||
$Key_{AUTH}$ Slot ID, where $Key_{AUTH\ P}$ =
Old Key or Master Key of length P bits
$M2_{N+B\ bit}$ = BlockCipher$_{CBC}$(K1$_N$, Counter$_{28}$ ||
FID$_5$ || 0 . . . 095|| New Key$_{N\ bit}$),
Where:
BlockCipher has block size of B bits (e.g.,
B = 128) and key of N bits. For
simplicity, we assume N is multiple of B.
K1$_N$ = N-bit-COMPRESSION_FUNC(Key$_{AUTH\ P}$ ||
KEY_UPDATE_ENCRYPTION_CONSTANTS)
$M3_{N\ bit}$ = N-bit-MAC-FUNC (K2$_N$, M1 ||M2)
Where:
K2$_N$ = N-bit-COMPRESSION_FUNC (Key$_{AUTH\ P}$ ||
KEY_UPDATE_CMAC_CST)
$M4_{128+B\ bit}$ = M1$_{128}$ || M4*$_B$
Where: M4*$_B$ = BlockCipher$_{CBC}$ (K3$_N$, Counter), and
K3$_N$ = N-bit-COMPRESSION_FUNC(NEW Key$_N$ ||
KEY_UPDATE_ENC_CST)
$M5_{N\ bit}$ = N-bit-MAC-FUNC(K4$_N$, M4)
Where:
K4$_N$ = N-bit-COMPRESSION_FUNC(NEW Key$_N$ ||
KEY_UPDATE_CMAC_CST), FIG. 8 is an illustration of two individual processing units 100, 102 that are implemented on both the one or more controllers 20 and the sender 22 shown in FIG. 1 (where the sender 22 is either the computer 24 located at the back-office 26 or the one or more trust anchor controllers 28). The individual processing unit 100 is based on the block cipher having a block size of B bits and an N-bit key size and includes a plurality of cryptography operations modules 104A-104C that employ the block cipher as a sub-routine. Specifically, cryptography operation module 104A implements encoding functions, cryptography operation module 104B implements decoding functions, and cryptography operation module 104C implements the N-bit compression function 70 shown in FIG. 7. The individual processing unit 102 is based on the N-bit message authentication code function employing Keccak-p permutations as the building blocks and includes a plurality of cryptography operations modules 106A-106B. Specifically, cryptography operation module 106A implements encoding operations and cryptography operation module 106B implements decoding operations.

Figure 9:
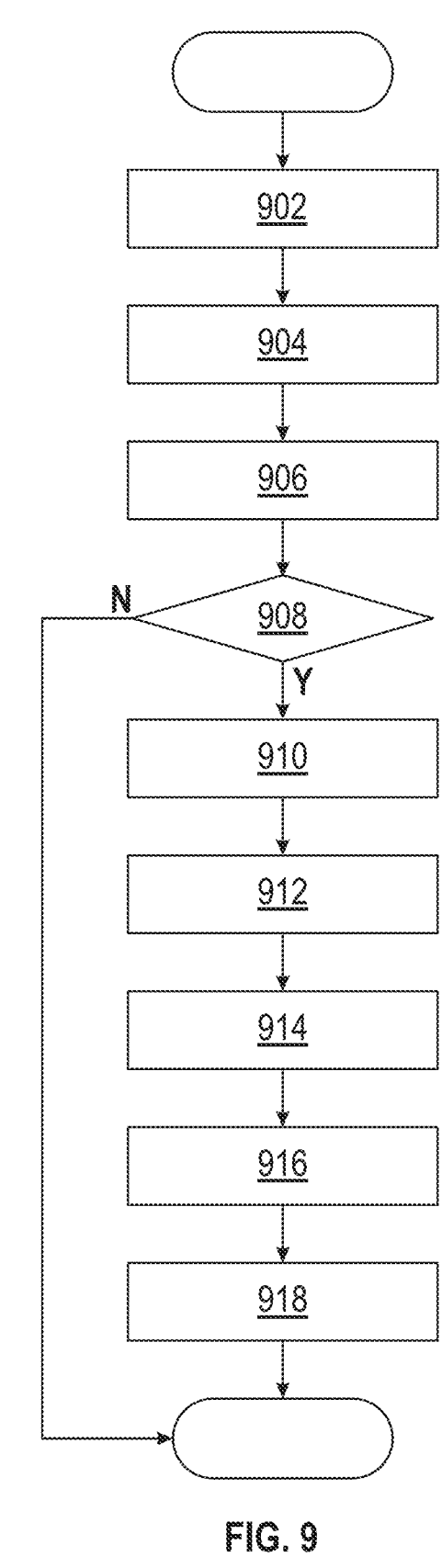
FIG. 9 is a process flow diagram illustrating another method for updating arbitrary length cryptographic keys by the cryptographic key update system based on the embodiment in Table 4, according to an exemplary embodiment.

FIG. 9 illustrates an exemplary process flow diagram illustrating a method 900 for updating cryptographic keys based on the embodiment of the cryptographic key update system 12 shown in Table 4. Referring to FIGS. 1, 2, and 9, the method 900 begins at block 902. In block 902, the sender 22 transmits the first transmission M1 to the one or more controllers 20. The sender 22 determines the first transmission, which includes the concatenation of the identifier corresponding to the one or more controllers 20 (ECU_ID), the slot identifier of the new cryptographic key (NEW Key Slot ID), and the slot identifier of the authentication key (Key$_{AUTH}$ Slot ID). The method 900 may then proceed to block 904.

In block 904, the sender 22 transmits the second transmission M2 to the one or more controllers 20, where the second transmission is a symmetric key encryption under the key encryption key (K1$_N$) of a concatenation of the plurality of parameters and the new cryptographic key (New Key$_{N\ bit}$). The method 900 may then proceed to block 906.

In block 906, the sender 22 transmits the third transmission M3 to the one or more controllers 20, where the third transmission M3 an N-bit message authentication code that is computed based on the N-bit message authentication code function under the first MAC key (K2$_N$) of the concatenation of the first transmission M1 and the second transmission M2, where the first MAC key (K2$_N$) is an N-bit value. The method 900 may then proceed to decision block 908.

In decision block 908, the one or more controllers 20 verify the data transmitted by the transmissions M1, M2, and M3. In response to determining the data transmitted by the transmissions M1, M2, and M3 is valid, the method 900 may proceed to block 910. Otherwise, the method 400 may terminate.

In block 910, in response to determining the data transmitted by the transmissions M1, M2, and M3 is valid, the one or more controllers 20 extract the new cryptographic key (New Key$_{N\ bit}$). The method 900 may then proceed to block 912.

In block 912, the one or more controllers 20 transmits the fourth transmission M4 to the sender 22. The fourth transmission M4 is a (128+B)-bit bit string that is a concatenation of the first transmission M1 received from the sender 22 and symmetric key encryption (M4*$_N$) of the freshness counter value (Counter$_{28}$) in the second transmission M2 under the second encryption key (K3$_N$). The method 900 may then proceed to block 914.

In block 914, the one or more controllers 20 transmits the fifth transmission M5 to the sender 22. The fifth transmission M5 is an N-bit message authentication code under a second MAC key (K4$_N$) of the fourth transmission M4, where the N-bit message authentication code is derived based on the N-bit message authentication code function. The method 900 may then proceed to block 916.

In block 916, the sender 22 receives the fourth transmission M4 and the fifth transmission M5 from the one or more controllers 20. The method 900 may then proceed to block 918.

In block 918, in response to receiving the fourth transmission M4 and the fifth transmission M5, the sender 22 verifies the fourth transmission M4 and the fifth transmission M5 to ascertain that the one or more controllers 20 obtained the correct version of the new cryptographic key (New Key$_{N\ bit}$). The method 900 may then terminate.

Referring generally to FIGS. 1-2 and 7-9, the disclosed cryptographic key update system for updating arbitrary length cryptographic keys having a length greater than 256 bits provides various technical effects and benefits. Specifically, the disclosed cryptographic key update system provides an approach for updating N-bit cryptographic keys at N-bit transport security, where the value of N is greater than 256. It is to be appreciated that the disclosed cryptographic key update system also employs a novel N-bit compression function for determining an output having an N-bit length as well as a novel N-bit message authentication code function for computing N-bit message authentication codes.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A method for updating cryptographic keys to 256-bit cryptographic keys by a cryptographic key update system, the method comprising:

transmitting, by a sender, a first transmission to one or more controllers that are part of a vehicle;

transmitting, by the sender, a second transmission to the one or more controllers, wherein the second transmission is a symmetric key encryption under a key encryption key of a concatenation of a plurality of parameters and a new cryptographic key, and wherein the sender derives the key encryption key by transforming an authentication key and a bit string of constant values based on a one-way compression function that is one of the following:

a modification detection code 2 (MDC-2) cryptographic hash function with a 128-bit advanced encryption standard (AES-128) as an underlying block cipher, a modification detection code 4 (MDC-4) cryptographic hash function with the AES-128 as the underlying block cipher, a Hirose compression function with a 256-bit advanced encryption standard (AES-256) as the underlying block cipher, and a 256-bit hash function;

transmitting, by the sender, a third transmission to the one or more controllers, wherein the third transmission is a 128-bit advanced encryption standard cipher-based message authentication code under a first message authentication code (MAC) key of a concatenation of the first transmission and the second transmission;

verifying, by the one or more controllers, data transmitted by the first transmission, the second transmission, and the third transmission;

in response to determining the data transmitted by the first transmission, the second transmission is valid, extracting, by the one or more controllers, the new cryptographic key; and executing, by the one or more controllers, one or more cryptographic validation operations based on the new cryptographic key.

2. The method of claim 1, further comprising:

in response to extracting the new cryptographic key, computing, by the one or more controllers, a fourth transmission and a fifth transmission based on the new cryptographic key.

3. The method of claim 2, further comprising:

transmitting, by the one or more controllers, the fourth transmission to the sender, wherein the fourth transmission is a bit string that is a concatenation of the first transmission received and a symmetric key encryption of a freshness counter value in the second transmission under a second encryption key and a symmetric key AES encryption.

4. The method of claim 3, further comprising:

deriving, by the one or more controllers, the second encryption key by transforming the new cryptographic key and the bit string of constant values based on one of the following: an advanced encryption standard Miyaguchi-Preneel compression function and a 128-bit hash function.

5. The method of claim 3, further comprising:

transmitting, by the one or more controllers, the fifth transmission to the sender, wherein the fifth transmission is a 128-bit message authentication code under a second MAC key of the fourth transmission.

6. The method of claim 5, further comprising:

deriving, by the one or more controllers, the second MAC key by transforming the new cryptographic key and the bit string of constant values based on one of the following: an advanced encryption standard Miyaguchi-Preneel compression function and a 128-bit hash function.

7. The method of claim 3, further comprising:

transmitting, by the one or more controllers, the fifth transmission to the sender, wherein the fifth transmission is a 256-bit message authentication code under a second MAC key of the fourth transmission.

8. The method of claim 7, further comprising:

deriving, by the one or more controllers, the second MAC key based on one of the following: the MDC-2 cryptographic hash function with the AES-128 as the underlying block cipher, the MDC-4 cryptographic hash function with the AES-128 as the underlying block cipher, and the Hirose compression function with the AES-256 as the underlying block cipher.

9. The method of claim 3, further comprising:

receiving, by the sender, the fourth transmission and the fifth transmission from the one or more controllers.

10. The method of claim 3, further comprising:

in response to receiving the fourth transmission and the fifth transmission, verifying, by the sender, the fourth transmission and the fifth transmission to ascertain that the one or more controllers obtained a correct version of the new cryptographic key.

11. The method of claim 1, further comprising:

determining, by the sender, the first transmission that includes a concatenation of an identifier corresponding to the one or more controllers, a slot identifier of the new cryptographic key, and a slot identifier of the authentication key.

12. A method for updating cryptographic keys to 256-bit cryptographic keys by a cryptographic key update system, the method comprising:

transmitting, by a sender, a first transmission to one or more controllers that are part of a vehicle;

transmitting, by the sender, a second transmission to the one or more controllers, wherein the second transmission is a symmetric key encryption under a key encryption key of a concatenation of a plurality of parameters and a new cryptographic key, and wherein the sender derives the key encryption key by transforming an authentication key and a bit string of constant values based on a one-way compression function that is one of the following:

a MDC-2 cryptographic hash function with an AES-128 as an underlying block cipher, a MDC-4 cryptographic hash function with the AES-128 as the underlying block cipher, a Hirose compression function with a 256-bit advanced encryption standard (AES-256) as the underlying block cipher, and a 256-bit hash function;

transmitting, by the sender, a third transmission to the one or more controllers, wherein the third transmission is a 128-bit advanced encryption standard cipher-based message authentication code under a first MAC key of a concatenation of the first transmission and the second transmission;

verifying, by the one or more controllers, data transmitted by the first transmission, the second transmission, and the third transmission;

in response to determining the data transmitted by the first transmission, the second transmission is valid, extracting, by the one or more controllers, the new cryptographic key;

transmitting, by the one or more controllers, a fourth transmission to the sender, wherein the fourth transmission is a bit string that is a concatenation of the first transmission received and a symmetric key encryption of a freshness counter value in the second transmission under a second encryption key and a symmetric key AES encryption;

transmitting, by the one or more controllers, a fifth transmission to the sender, wherein the fifth transmission is a 256-bit message authentication code under a second MAC key of the fourth transmission; and executing, by the one or more controllers, one or more cryptographic validation operations based on the new cryptographic key.

13. The method of claim 12, further comprising:

deriving, by the one or more controllers, the second MAC key based on one of the following: the MDC-2 cryptographic hash function with the AES-128 as the underlying block cipher, the MDC-4 cryptographic hash function with the AES-128 as the underlying block cipher, and the Hirose compression function with the AES-256 as the underlying block cipher.

14. The method of claim 12, further comprising:

receiving, by the sender, the fourth transmission and the fifth transmission from the one or more controllers.

15. The method of claim 14, further comprising:

in response to receiving the fourth transmission and the fifth transmission, verifying, by the sender, the fourth transmission and the fifth transmission to ascertain that the one or more controllers obtained a correct version of the new cryptographic key.

16. The method of claim 12, further comprising:

deriving, by the sender, the first MAC key by transforming the authentication key and the bit string of constant values based on one of the following: an advanced encryption standard Miyaguchi-Preneel compression function and a 128-bit hash function.

17. A method for updating cryptographic keys to 256-bit cryptographic keys by a cryptographic key update system, the method comprising:

transmitting, by a sender, a first transmission to one or more controllers that are part of a vehicle;

transmitting, by the sender, a second transmission to the one or more controllers, wherein the second transmission is a symmetric key encryption under a key encryption key of a concatenation of a plurality of parameters and a new cryptographic key, and wherein the sender derives the key encryption key by transforming an authentication key and a bit string of constant values based on a one-way compression function that is one of the following:

a MDC-2 cryptographic hash function with an AES-128 as an underlying block cipher, a MDC-4 cryptographic hash function with the AES-128 as the underlying block cipher, an Hirose compression function with an AES-256 as the underlying block cipher, and a 256-bit hash function;

transmitting, by the sender, a third transmission to the one or more controllers, wherein the third transmission is a 256-bit message authentication code under a first MAC key of a concatenation of the first transmission and the second transmission;

verifying, by the one or more controllers, data transmitted by the first transmission, the second transmission, and the third transmission;

in response to determining the data transmitted by the first transmission, the second transmission is valid, extracting, by the one or more controllers, the new cryptographic key;

transmitting, by the one or more controllers, a fourth transmission to the sender, wherein the fourth transmission is a bit string that is a concatenation of the first transmission received and a symmetric key encryption of a freshness counter value in the second transmission under a second encryption key and a symmetric key AES encryption;

transmitting, by the one or more controllers, a fifth transmission to the sender, wherein the fifth transmission is a 256-bit message authentication code under a second MAC key of the fourth transmission; and executing, by the one or more controllers, one or more cryptographic validation operations based on the new cryptographic key.

18. The method of claim 17, further comprising:

deriving, by the sender, the first MAC key by transforming the authentication key and the bit string of constant values based on a 256-bit message authentication code function.

19. The method of claim 17, further comprising:

receiving, by the sender, the fourth transmission and the fifth transmission from the one or more controllers.

20. The method of claim 19, further comprising:

in response to receiving the fourth transmission and the fifth transmission, verifying, by the sender, the fourth transmission and the fifth transmission to ascertain that the one or more controllers obtained a correct version of the new cryptographic key.

\* \* \* \* \*